United States Patent Office 3,186,912
Patented June 1, 1965

3,186,912
COSMETIC EMULSION
Robert L. Beamer, 2320 N. Kilpatrick St., Portland, Oreg.
No Drawing. Filed Aug. 3, 1959, Ser. No. 830,994
5 Claims. (Cl. 167—91)

This invention pertains to cosmetic emulsions of varying viscosity, and relates particularly to a stable emulsified cosmetic cream having both sunscreening and insect repellent properties. This application is a continuation-in-part of my earlier application, Serial No. 532,790, filed September 6, 1955, now abandoned.

People living, playing, or working in the out of doors are confronted with one or both of two problems, namely the burning effects of the ultraviolet rays of the sun and the disagreeable and oftentimes harmful effects of insects. In certain of these localities and in certain seasons of the year, one or the other of these problems predominates, while in other localities and in other seasons both problems are presented concurrently within the normal period of exposure. Thus, in winter the sport of skiing is attended by the serious and harmful effects of ultraviolet rays reflected from snow. Other areas are infested with insects, especially in the absence of sunlight for extended periods of time. In many areas during the summer months, vacationers and workers experience both discomforts and dangers of an excess of ultraviolet rays and of biting insects.

There are many products commercially available for the control of the sun's rays and for the repelling of insects. They are not completely satisfactory, however, for several reasons, among which are the following:

First, there is no single preparation commercially available in emulsified form which possesses both qualities of sunscreening and insect repellency.

Second, insect repellent preparations commercially available generally are characterized by excessive oiliness or greasiness and hence are uncomfortable and unsightly to wear. Many of these impair the natural flow of perspiration from the skin and thus cause discomfort to the wearer.

Third, the insect repellent emulsions commercially available are characterized by being effective only for such short periods of time as to require the user to have a supply continuously available for frequent reapplication. This requirement not only is an inconvenience, but quite often cannot be achieved, in which case the user once again is exposed to harmful sun days and to insects shortly after having taken the precaution against them.

Fourth, both insect repellent compositions and sun screen preparations commercially available heretofore are too easily removed from the skin. In the normal activity of sports or work many of these products are readily removed by normal perspiration within a very short time. Most products are removed almost immediately during swimming, and hence are of no practical value in connection therewith.

Fifth, the effective insect repellent preparations commercially available are not truly emulsified cosmetic preparations, in the sense that they benefit and beautify the skin.

Accordingly, it is a principal object of the present invention to provide a cosmetic emulsion which overcomes the disadvantages enumerated hereinbefore, and to provide a method for manufacturing the same.

Another important object of this invention is the provision of a stable emulsified cream of cosmetic quality possessing properties of sunscreening and insect repellency.

A further important object of the present invention is the provision of a novel emulsifier for water in oil emulsions.

Still another important object of this invention is the provision of a stable emulsified cosmetic cream prepared from a water in oil emulsion.

A still further important object of the present invention is to provide an emulsified cosmetic cream of superior quality and to provide a simplified and economical method for manufaicturing the same.

The foregoing and other objects and advantages of the present invention will appear from the following detailed description of the product and its method of manufacture.

In its basic concept, the preparation of the emulsion of the present invention involves the formation of a primary emulsifier of the water in oil type. This type of emulsifier is particularly desirable for the present invention since it provides a cosmetic preparation which is water repellent. The oil phase of the preparation adheres to and lubricates the skin.

The primary emusifier is produced by reacting an amine compound, or combinations thereof, with one or more fatty acids. The resulting fatty acid salt of the amine is an emulsifier of the water in oil type. Although it is non-ionic in nature, it adheres to the skin. In dilution the fatty acid amine salt has a pH below 7.

The surface active compounds employed for the purpose of the present invention must be capable of forming water in oil emulsions, and may be derivatives of primary amines of the general formula R—NH$_2$, secondary amines of the general formula

and tertiary amines of the general formula

wherein R, R$_1$, R$_2$, R$_3$, R$_4$, R$_5$ are alkyl radicals, or derivatives thereof, ranging from C$_8$ to C$_{30}$. Examples of these are octyl amine, melissyl amine, stearyl amine, iso octyl amine, n hydroxyl melissyl amine, oleyl amine, di-octyl amine, distearlyl amine, dimelissyl amine, dioctanol amine, dioleyl amine, dimelissyl amine (isomeric forms), trioctyl amine, tristearyl amine, trimelissyl amine, trioctanol amine, trioleyl amine, and dimelissyl amine (isomeric forms).

The compounds also may be derived from compounds and derivatives thereof having the general formula

wherein R$_6$, R$_7$, R$_8$, R$_9$ are long chain alkyl radicals, or mixtures of alkyl and benzyl radicals, and wherein X is a halogen or other radical which may be replaced with a long chain fatty acid having a carbon chain ranging from 14 to 20. Examples of these are dimethyldodecylstearylammonium chloride, dimethyldodecylstearylammonium palmitate, and methylbenzyldodecylstearylammonium stearate.

In the preferred embodiment of this invention the primary emulsifier is derived from tertiary amines having the general formula

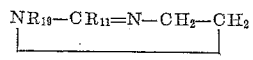

wherein R$_{10}$ is an alkyl hydroxy group of the general formula C$_n$H$_{2n}$OH, and wherein R$_{11}$ is a saturated or unsaturated carbon chain corresponding to the general formula CH$_3$(CH$_2$)$_n$, or the unsaturated derivatives thereof, wherein $n$ ranges from 8 to 30. Examples of these are 1-hydroxyethyl-2 heptadecyl imidazoline, 1-hydroxyethyl-2 heptadecenyl imidazoline, and 1-hydroxyethyl-2 undecyl imidazoline.

The fatty acids employed in the foregoing reaction may be of saturated or unsaturated types of the general formula $C_nH_{2n}O_2$; $C_nH_{2n-2}O_2$; $C_nH_{2n-4}O_2$; and $C_nH_{2n-6}O_2$; wherein $C_n$ may range from $C_8$ to $C_{30}$. In practice, these fatty acids may be obtained from beeswax, carnauba wax, coconut oil, or from other well known sources, or by synthesis. Examples of the foregoing are caprylic acid, lauric acid, myristic acid, stearic acid, cerotic acid, melissic acid, decylenic acid, oleic acid, eleostearic acid, cetoleic acid, and tariric acid.

The primary emulsifier produced as described above is a solid substance which is softened, i.e., its melting point is lowered, by the addition of such emolients as vegetable oils, alcohol esters of fatty acids, and other fatty materials. The alcohol esters of fatty acids are secondary emulsifiers for water in oil emulsions. These materials contribute materially toward giving a smooth feel to the skin when the cream is applied. Among the many esters which may be used there is included polyethylene glycols and the monohydric alcohol esters of ethyl, butyl and isopropyl alcohol and stearic, palmitic and myristic acids, and other saturated or unsaturated fatty acids of the general formula $C_nH_{2n}O_2$, or $C_nH_{2n-2}O_2$, or $C_nH_{2n-4}O_2$. Examples of such esters and oils are stearin, cerotin, polyoxyl 40 stearate, almond oil, corn oil, cottonseed oil, peanut oil, coconut oil, and linseed oil.

The foregoing preparation may be mixed with water and passed through an homogenizer or colloid mill to provide a stable cosmetic emulsion which, in its preferred form provides a cosmetic cream which is suitable for use on the skin as a cleansing or foundation cream. The cream is characterized by having a pH below 7.

It has been discovered that the foregoing base emulsion may be employed as a vehicle for sunscreen agents and insect repellents, either separately or in combination. The latter is an important feature of the present invention, since there has not been provided heretofore a stable emulsified cosmetic cream possessing both qualities of sunscreening and insect repellency.

There are many well-known types and classes of sunscreen agents. Among these are the benzoates, salicylates, anthranalates, and many others. They may be used in various concentrations to provide selective filtration of ultraviolet rays, for complete or controlled blocking, as desired.

Similarly, there are many well known types and classes of insect repellents, of which the following are a few examples: butyl mesityl oxide (Indalone); 2-ethylhexane-1, 3-diol (Rutgers 612); propyl N,N-diethylsuccinamate; bicyclo-(2,2,1)-5-heptene-2, 3-dicarboxylic acid dimethyl ester (Dimelone).

In the preparation of the emulsified cosmetic cream possessing sunscreening and insect repellency properties, it is desired that a thickening agent be incorporated for the oil phase to control the viscosity thereof and to prevent breakdown of the emulsion in the presence of the insect repellents. Various types of thickening agents may be used, such as ethyl cellulose, waxes, and fatty alcohols. The latter are preferred, and they may be of the general structure $C_nH_{2n+2}O$, wherein $n$ ranges from 8 to 31. Examples of fatty alcohols are octyl, stearyl, melissyl alcohols; cetostearyl alcohol and spermaceti. Mixtures of these materials may also be used, and they may be provided in the form of natural products which contain them.

It is also desirable that there be added to the composition a fatty acid metal salt. The fatty acid metal salt functions as a secondary emulsifier and as a thickener for the oil phase to prevent breakdown of the emulsion in the presence of the insect repellent compositions. It also renders the oils less greasy on the skin and provides additional water repellency for the cream. Examples of these are aluminum, magnesium, calcium, barium, or strontium salts of saturated or unsaturated fatty acids, in which the carbons in the chain range from 8 to 20. Examples of these are the above metal salts of caprylic, linolearic, oleic and stearic acids. Aluminum monostearate is a preferred composition.

Certain ingredients of the composition are required to be incorporated in the oil phase. However, some of these are not soluble in the oil phase. For example, certain insect repellents are not soluble in the amines. Accordingly, it is desirable that a coupling agent be provided to carry these materials into solution. Coupling agents function as mutual solvents for the components of the oil phase and thereby render said components miscible with each other. Examples of coupling agents are oleic acid, ethylene glycol and such glycol ethers as diethylene glycol monobutyl ether (butyl carbitol); diethylene glycol monoethyl ether; tripropylene glycol ether; and others.

A soft creamy consistency is provided by addition to the preparation of a fatty acid ester of sorbitol, such as sorbitol trioleate; sorbitol monooleate; sorbitol sesquioleate, sorbitol laurate, sorbitol palmitate, sorbitol stearate, and others. These are hydrophobic secondary emulsifiers for water in oil emulsions.

The oil phase of the emulsion is composed of the primary emulsifier, the softening agent, the sun screen, the insect repellent, the oil phase thickener, the fatty acid metal salt, the mutual solvent, and the fatty acid ester of sorbitol, described hereinbefore, since these substances are insoluble in water. It will be recognized by those skilled in the art that most of these components are not oils of the conventional type, such as vegetable oils, generally used for the oil phase of water in oil emulsions. However, these components and the conventional type oils are similar in the important respect that they both constitute the external or continuous phase of the emulsion. Accordingly, since the base emulsifier of this invention may be used with conventional oils as well as with the components described hereinbefore to produce emulsions of the water in oil type, the term oil phase as used in the appended claims is intended to include all materials which form the external phase of emulsions of the water in oil type.

It is further desired in the preparation of the emulsified cream of the present invention that the water phase be adjusted to the same viscosity as the oil phase, preparatory to combination. This may be achieved by the use of such materials as colloidal clays of aluminum silicate, aluminum magnesium silicate, and others.

If desired, various anti-oxidants, such as 2,6-ditertiary-butyl-4-methylphenol (Ionol), may be incorporated in the preparation to prevent rancidity. In addition, it is desirable to perfume the cream to provide a pleasing aroma, compatible with the intended use of the product.

The ingredients discussed hereinbefore may be combined in various proportions. In the following Table A the quantity range of preferred use of each ingredient is identified in parts by weight:

*Table A*

| Ingredient: | Quantity range (parts by weight) |
|---|---|
| Amine | 1–10 |
| Fatty acid | 3–13 |
| Thickening agent for oil phase | 2–8 |
| Softening agent for amine-fatty acid reaction product | 5–15 |
| Fatty acid metal salt | 1–5 |
| Coupling agent | 0.5–5 |
| Sunscreen | 1–7 |
| Insect repellent | 5–60 |
| Fatty acid ester of sorbitol | 2–10 |
| Water | 30–50 |
| Thickening agent for water phase | 0.5–4 |

In Table B a typical and preferred formulation is set forth, and the quantity of each specific ingredient is identified in parts by weight:

Table B

| Ingredient: | Quantity range (parts by weight) |
|---|---|
| 1-hydroxyethyl-2-heptadecyl imidazoline | 2 |
| Beeswax (5), coconut oil fatty acid (2) | 7 |
| Stearyl alcohol | 5 |
| Isopropyl palmitate | 8 |
| Aluminum monostearate | 2 |
| Butyl carbitol | 1.5 |
| Dipropylene glycol salicylate | 3.5 |
| Dimethyl phthalate (12.8), Dimelon (0.2), Rutgers 612 (3.3), Indalone (8.7) | 25 |
| Sorbitol trioleate | 6 |
| Water | 39 |
| Aluminum magnesium silicate | 1 |

It is to be noted from Table A that the amount of insect repellent composition capable of being incorporated in the emulsified cream ranges upwardly to about 60 percent by weight of the product, with the typical formulation (Table B) containing about 25 percent by weight. It is recognized generally that preparations containing insect repellent compositions in concentrations not exceeding about 10 percent by weight, are effective only for very short periods of time and only against certain types of insects. On the other hand, it has not been possible heretofore to incorporate with conventional emulsified cosmetic creams amounts of insect repellent compositions in concentrations greater than about 10 percent by weight, because the solvent action of the insect repellent compositions causes the emulsions to break down. Thus, there has not been available heretofore an emulsified cosmetic cream offering effective insect repellency.

It will be understood that if it is desired to increase the proportion of insect repellent in the cream from the amount contained in the typical formulation, a proportionate increase in amine, fatty acid and fatty alcohol, and a proportionate decrease in oil phase thickener and water phase, is required to mintain a properly balanced and stable product.

The preferred method of manufacture of the cream exemplified by the typical formulations set forth in Table A is as follows:

The tertiary amine, the fatty acid and the fatty alcohol are combined and heated to a temperature ranging from about 80° C. to about 90° C. for a time sufficient to complete the reaction. The reaction between the amine and fatty acid is enhanced by the presence of the fatty alcohol. Complete neutralization of the amine must be obtained, and this is indicated by an excess of fatty acid remaining. The pH of the final solution is about 6.5.

In another vessel the fatty acid metal salt and the alcohol ester of fatty acid are heated together at a temperature of from about 75° C. to 85° C., with continuous agitation, for a period of time sufficient to produce a translucent jell. The glycol ether is then added, with continued agitation, and the resulting mixture is combined with the reaction product of the amine and fatty acid.

It has been found that the preparation of the translucent jell is a necessary procedure, for a stable emulsified cream is not formed when these separate ingredients are added directly to the reaction product of the amine and fatty acid.

The insect repellent, the sunscreen and the fatty acid ester of sorbitol, together with anti-oxidants, if used, are heated together at a temperature not greater than about 70° C. and added to the mixture described above. The colloidal clay and water are heated together, with agitation, at a temperature of about 95° C., until a uniform dispersion is obtained, and this dispersion then is added to the foregoing mixture. Agitation is continued until the mixture has cooled sufficiently to add perfume, after which the mixture is blended by continued agitation or, preferably, by passing through an homogenizer or colloid mill.

The resulting cream is completely stable over a temperature ranging from about −25° to about +50° C. It spreads easily and uniformly, providing a soft, comfortable feel to the skin. The pH of the cream is about 6.6. The cream is quite dry when applied to the skin, and thus presents no uncomfortable or unsightly greasy appearance.

The cream provides effective sunscreening and insect repellency for several hours of normal activity in sports or work. It adheres to the skin, and is not worn away by normal activity. Its water repellency assures retention on the skin even during swimming, thereby affording continued sun and insect protection for extended periods of time. The cream may be removed by soap and water, when desired.

It will be apparent to those skilled in the art that various changes may be made in the composition, such as the substitutioin of equivalent ingredients and in the proportions thereof, and in the method of manufacture, without departing from the scope and spirit of this invention. Accordingly, it is to be understood that the foregoing description is primarily illustrative of the invention and is not to be considered as limiting the scope thereof.

Having now described my invention and the manner n which the same may be used, what I claim as new and desire to secure by Letters Patent is:

1. A cosmetic water in oil emulsion cream comprising the blended mixture of a water phase and an oil phase, wherein the oil phase includes the product of reacting at from about 80° C. to about 90° C. an excess of fatty acid having a carbon chain ranging from 8 to 30; and an amine characterized by forming water in oil emulsions and having the formula

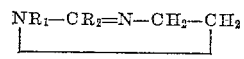

wherein $R_1$ is an alkyl hydroxy of the formula $C_nH_{2n}OH$ wherein $n$ ranges from 8 to 30, and $R_2$ is a radical having the formula $CH_3(CH_2)_n$ wherein $n$ ranges from 8 to 30.

2. The cosmetic water in oil emulsion cream of claim 1 wherein the oil phase includes a jell formed of a mixture of an emolient selected from a class consisting of vegetable oils and alcohol esters of fatty acids, and a fatty acid metal salt selected from the class consisting of aluminum, magnesium, calcium, barium and strontium salts of saturated and unsaturated fatty acids having a carbon chain ranging from 8 to 30.

3. The cosmetic water in oil emulsion cream of claim 2 wherein the oil phase includes an insect repellent component, the insect repellent component constituting up to 60% by weight of the cream.

4. A cosmetic water in oil emulsion cream having sun screening and insect repellent properties, comprising the blended mixture containing the product of reacting at from about 80° C. to about 90° C. from 3 to 13 parts by weight of fatty acid having a carbon chain ranging from 8 to 30 and from 1 to 10 parts by weight of an amine characterized by forming water in oil emulsions and having the formula

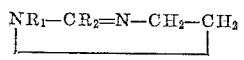

wherein $R_1$ is an alkyl hydroxy of the formula $C_nH_{2n}OH$ wherein $n$ ranges from 8 to 30 and $R_2$ is a radical having the formula $CH_3(CH_2)_n$ wherein $n$ ranges from 8 to 30; from 2 to 8 parts by weight of the fatty alcohol of the formula $C_nH_{2n+2}O$ wherein $n$ ranges from 8 to 31; a jell formed of a mixture of from 5 to 15 parts by weight of an emolient selected from a class consisting of vegetable oils and alcohol esters of fatty acids, and from 1 to 5 parts by weight of a fatty acid metal salt selected from the class consisting of aluminum, magnesium, calcium, barium and strontium salts of saturated and unsaturated fatty acids having a carbon chain ranging from 8 to 20; from 0.5 to 4 parts by weight of a mutual solvent to render mutually miscible the components of the oil phase; from 2 to 10 parts by weight of sun screen agent, from 5 to 60 parts by weight of insect repellent; and from 30 to 50 parts by weight of water.

5. A cosmetic water in oil emulsion cream having sun screen and insect repellency properties, comprising the blended mixture containing the product of reacting at from about 80° C. to about 90° C. about 5 parts by weight of beeswax, about two parts by weight of coconut oil fatty acid, and about 2 parts by weight of 1-hydroxyethyl-2-heptadecyl imidazoline; about 5 parts by weight of stearyl alcohol; a translucent jell formed of a mixture of about 8 parts by weight of isopropyl palmitate and about 2 parts by weight of aluminum monostearate; about 1.5 parts by weight of butyl carbitol; about 6 parts by weight of sorbitol trioleate, about 3.5 parts by weight of sunscreen agent, about 25 parts by weight of insect repellent, about 39 parts by weight of water; and about 1 part by weight of colloidal clay.

References Cited in the file of this patent

UNITED STATES PATENTS

| | | |
|---|---|---|
| 2,247,106 | Vanderbilt | June 24, 1941 |
| 2,387,336 | Littler | Oct. 23, 1945 |
| 2,435,005 | Huppke | Jan. 27, 1948 |
| 2,507,193 | Buckwalter | May 9, 1950 |
| 2,659,731 | Luvisi | Nov. 17, 1953 |

OTHER REFERENCES

Chemistry of Fatty Amines, Armour & Co., Chem. Div. Chicago, Ill., 1948, pp. 1–3, 5, 10, 11, 17, 18.

Atlas Powder Co., Wilmington, Del., Drug and Cosmetic Emulsions, 1946, pp. 1–8, 14–17, 27, 28, 29, 34.

J.A.Ph.A., Sci. Ed., July 1946, pp. 208–212.

Synthetic Organic Chemicals, Carbide & Carbon Chem. Co. (Union Carbide Corp.), 13th. ed., 1952, pp. 86, 88, 93.